United States Patent [19]
Weiss et al.

[11] Patent Number: 4,723,482
[45] Date of Patent: Feb. 9, 1988

[54] DEVICE FOR COOKING SAUSAGES

[75] Inventors: Ronald R. Weiss, Colerain Township; Jerry K. Phillips, Springfield Township, both of Hamilton County, Ohio

[73] Assignee: Gold Metal Products Co., Cincinnati, Ohio

[21] Appl. No.: 51,759

[22] Filed: May 20, 1987

[51] Int. Cl.[4] ............ A47J 37/04; A47J 43/18
[52] U.S. Cl. .................... 99/441; 99/427; 99/443 R; 99/443 C; 99/448; 99/397
[58] Field of Search .......... 99/391, 395, 397, 427, 99/441, 443 R, 443 C, 448, 449, 477, 478, 479, 480; 126/41 A, 41 B

[56] References Cited

U.S. PATENT DOCUMENTS

| | | | |
|---|---|---|---|
| 2,828,686 | 4/1958 | Nelems | 99/427 |
| 3,372,636 | 3/1968 | Marasco | 99/443 R X |
| 3,643,588 | 2/1972 | Schwarz | 99/441 X |
| 3,657,995 | 4/1972 | Adamitis | 99/443 R |
| 3,811,376 | 5/1974 | Mills | 99/427 |
| 4,005,646 | 2/1977 | Krüper | 99/427 |
| 4,300,523 | 11/1981 | Robertson et al. | 126/41 B X |
| 4,355,569 | 10/1982 | Sage | 99/441 X |

Primary Examiner—Donald Watkins
Attorney, Agent, or Firm—James W. Pearce; Roy F. Schaeperklaus

[57] ABSTRACT

A sausage heating machine. A plurality of baskets mounted on a framework of the machine turn with the framework. Each basket has guide members for supporting a sausage. Each guide member includes a main portion on which the sausage can roll as the framework turns. The sausage can fall crosswise of the guide member at leading end portions of the guide members. Hook shaped trailing edge portions of the guide members catch and hold the sausage when the sausage has fallen. Radiant heat is projected crosswise of the framework to heat and cook the sausage as the framework turns.

3 Claims, 7 Drawing Figures

DEVICE FOR COOKING SAUSAGES

BACKGROUND OF THE INVENTION

This invention relates to a device for cooking sausages and the like. More particularly, this invention relates to a wheel-like device for cooking sausages which exposes all sides of each sausage to radiant heat from a heating element.

Wheel-like devices for carrying sausages as the sausages are cooked are shown in Marasco U.S. Pat. No. 3,372,636 and Schwarz et al. U.S. Pat. No. 3,643,588. Schwarz et al. shows a device in which each sausage is enclosed inside a basket which limits turing of the sausage. Marasco shows a wheel-like device which carries baskets in which pieces of beef or the like ar confined. An object of this invention is to provide a wheel-like cooking device in which each basket supports a sausage for rolling and turning movement so that the sausage is cooked on all sides as the wheel-like device turns.

Langen U.S. Pat. No. 4,549,476 and Hall U.S. Pat. No. 1,062,001 show devices for supporting articles for rolling travel but do not show the cooking device of this invention.

BRIEF DESCRIPTION OF THE INVENTION

Briefly, this invention provides a wheel-like cooking device for sausages and the like in which a rotating frame carries a plurality of basket assemblies, each of which holds a sausage. A heating element is disposed in the device for heating the sausages in the basket assemblies. Each basket assembly is attached to the frame. Each basket assembly carries track or guide members which guide the sausages for turning as the frame turns to roll and expose all sides of each sausage to the heating element.

The above and other objects and features of the invention will be apparent to those skilled in the art to which this invention pertains from the following detailed description and the drawings, in which:

BRIEF DESCRIPTION OF THE DRAWINGS

In the following detailed description and the drawings, like reference characters indicate like parts.

DESCRIPTION OF THE PRESENTLY PREFERRED EMBODIMENT

Figure 1:
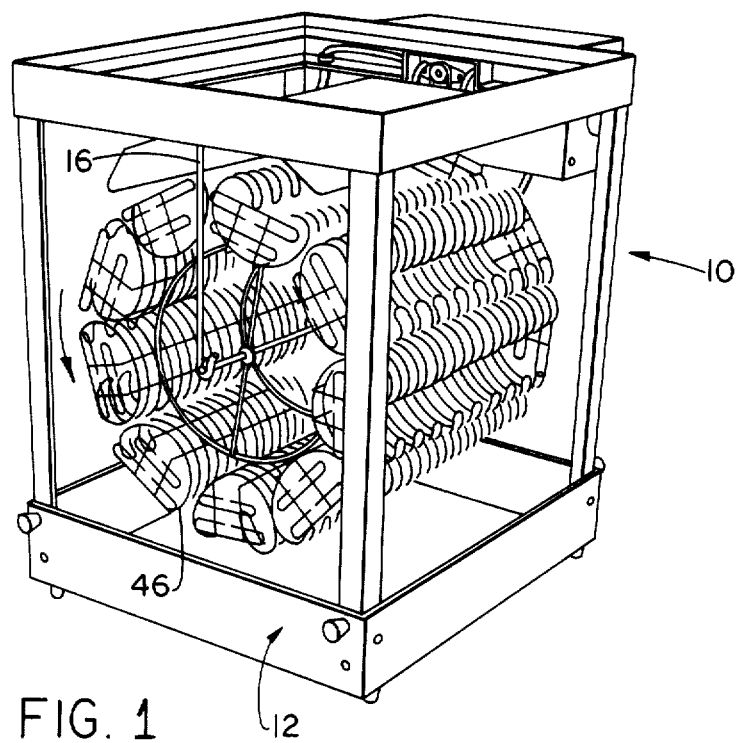
FIG. 1 is a perspective view of a sausage cooking machine constructed in accordance with an embodiment of this invention.
Figure 2:
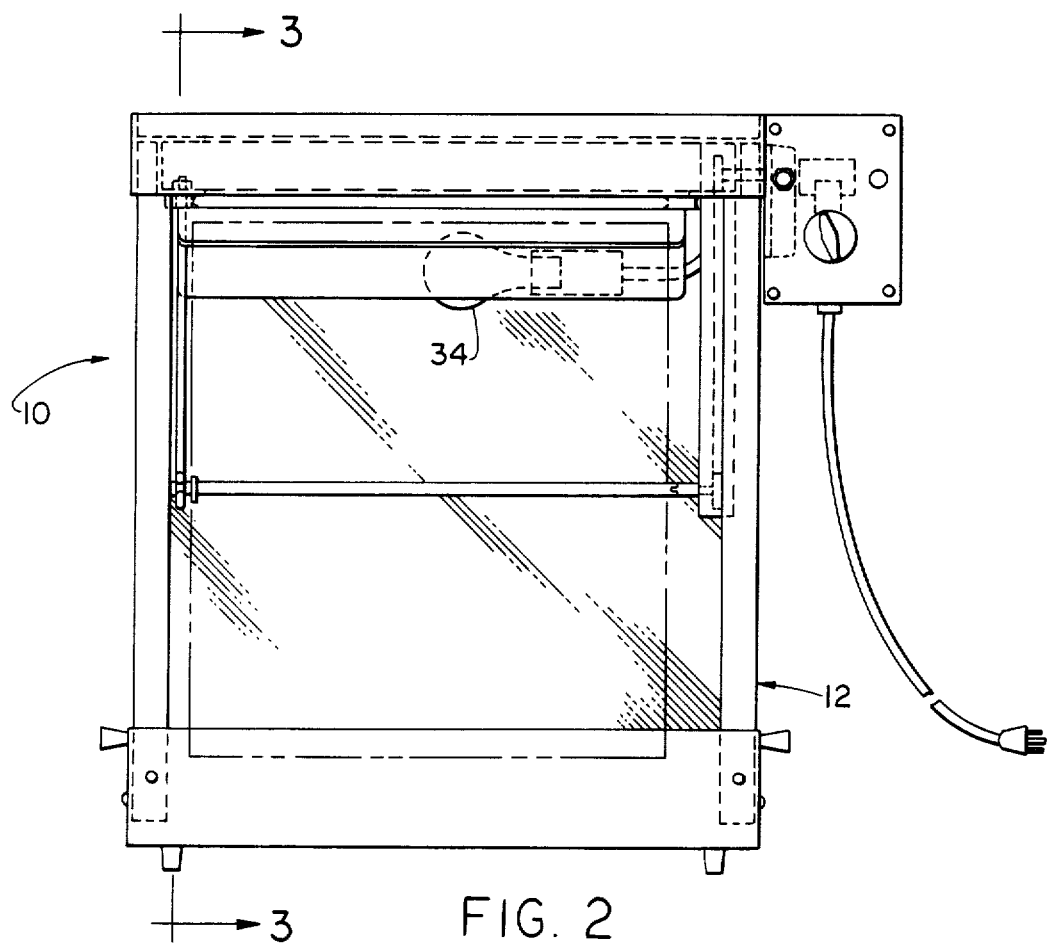
FIG. 2 is a view in side elevation of the machine shown in FIG. 1.
Figure 3:
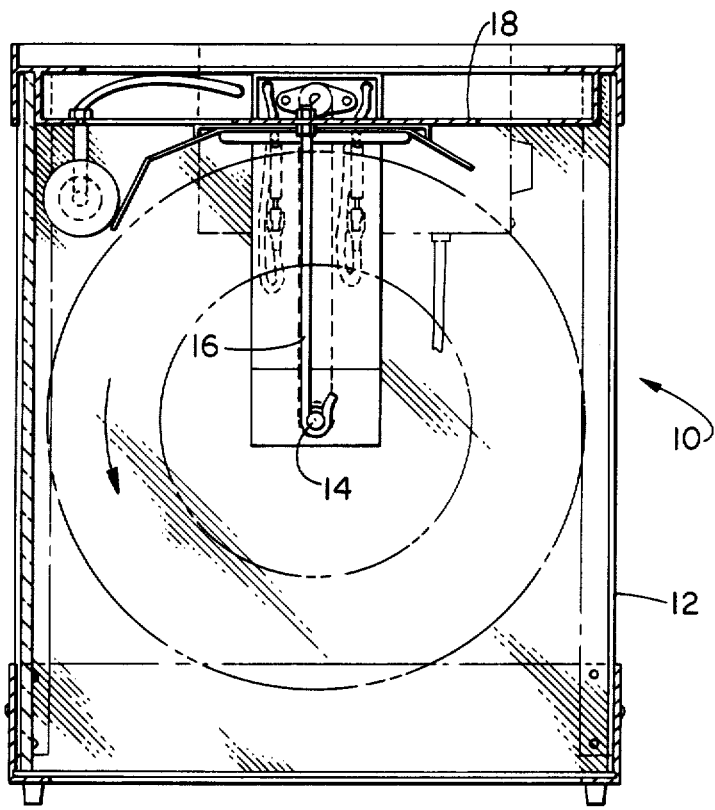
FIG. 3 is a view in section taken on the line 3—3 in FIG. 2, some parts being omitted for clarity.
Figure 5:
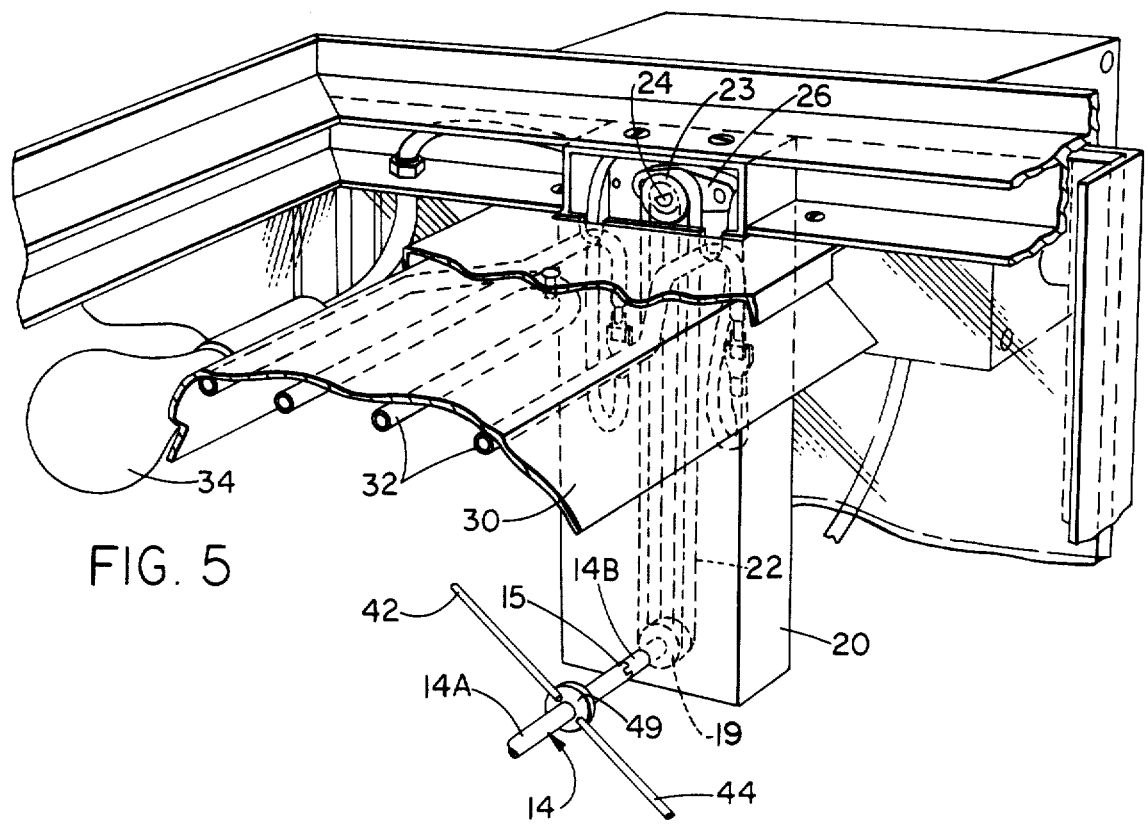
FIG. 5 is a fragmentary perspective view on an enlarged scale of a heating element of the device and associated parts.
Figure 6:
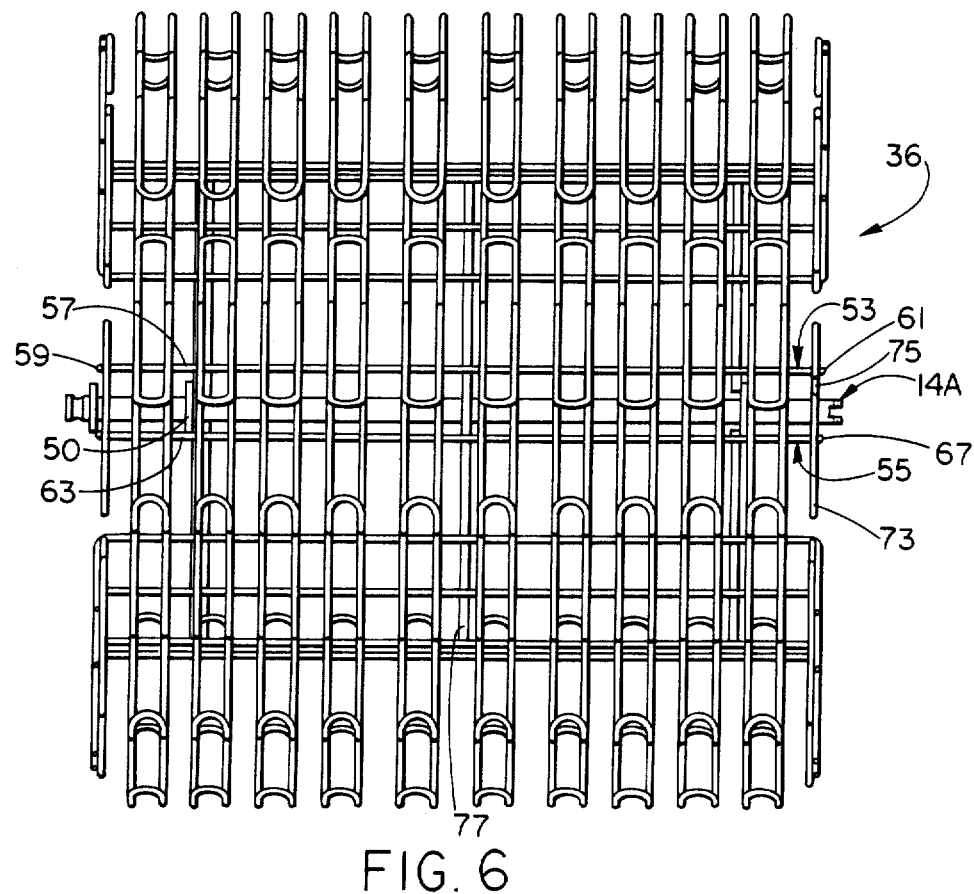
FIG. 6 is a plan view of the sausage holding wheel assembly shown in FIG. 4.

In FIG. 1 is shown a sausage cooking machine 10 which is constructed in accordance with an embodiment of this invention. The machine 10 includes a case 12 inside which is rotatably mounted a horizontal shaft assembly 14 (FIGS. 5 and 6). The shaft assembly includes a main shaft portion 14A and a short shaft portion 14B. The shaft portions 14A and 14B are connected together by a cross pin 15. An end section of the main shaft portion 14A is rotatably mounted on a hook member 16 (FIG. 1), which is supported from a frame member 18 (FIG. 3). Bearings (not shown) in a housing 20 (FIG. 5) rotatably support the short shaft portion 14B. A pulley 19 mounted on the short shaft portion 14B drives the shaft assembly 14. A belt 22 drives the pulley 19. The belt 22 is driven by a pulley 23 mounted on a shaft 24. The shaft 24 is supported on a bearing assembly 26. A hood 30 is mounted in the upper portion of the case 12. The hood 30 carries heating elements 32. A lamp 34 illuminates the interior of the case 12.

Figure 4:
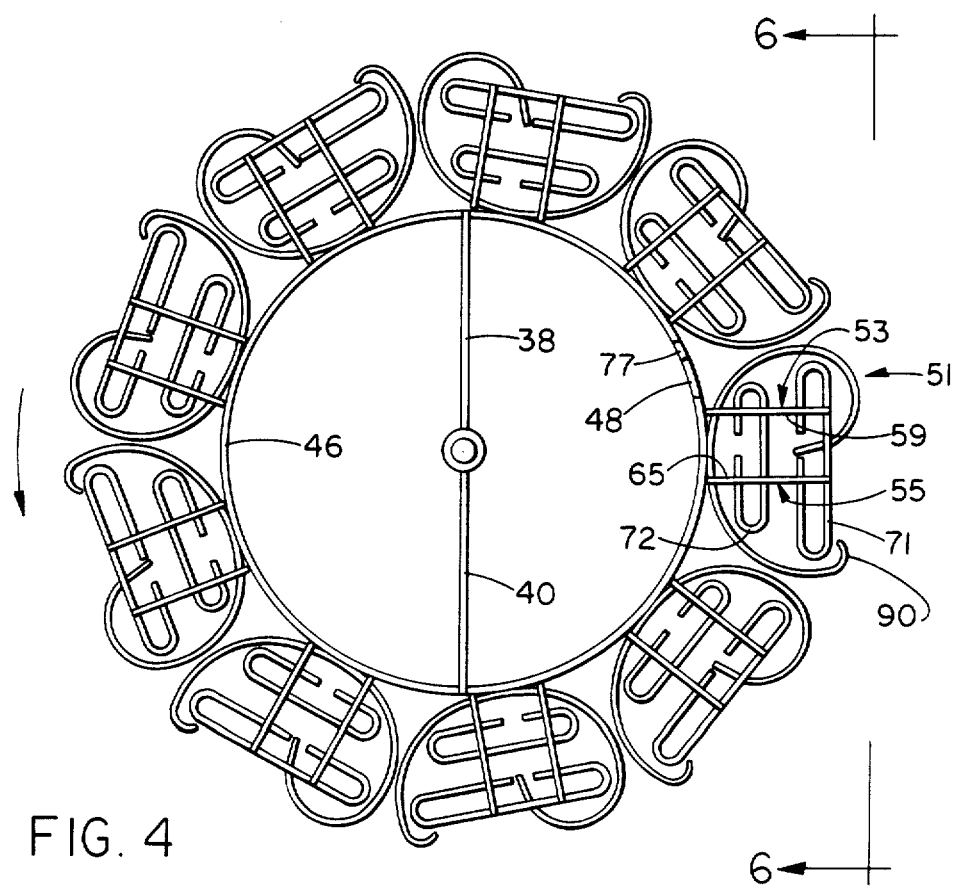
FIG. 4 is a view on an enlarged scale in an end elevation of a sausage holding wheel assembly of the invention removed from an outer case.

The main shaft portion 14A carries a cage assembly 36 (FIGS. 4, 5 and 6). The cage assembly 36 includes radial supports 38, 40, 42 and 44, which carry circular end supports 46 and 48.

The radial supports 38, 40, 42 and 44 and the circular end supports 46 and 48 turn with the main shaft portion 14A. The radial supports 42 and 44 are attached to a washer 49, which is attached to the main shaft portion 14A. The radial supports 38 and 40 similarly are attached to a washer 50, which is attached to the main shaft portion 14A. Basket assemblies 51 are mounted on the circular end supports 46 and 48. The basket assemblies are similar in structure and only one basket assembly will be described in detail. The basket assembly 51 includes frame members 53 and 55. The frame member 53 includes an elongated main portion 57 and flanges 59 and 61. The frame member 55 is of similar construction and has a main portion 63 and flanges 65 and 67. End stop members 71 and 72 link the flanges 59 and 65. Similar end stop members 73 and 75 link the flanges 61 and 67. The elongated main portions are attached to the circular end support 46, the circular support 48 and a central circular support 77.

Figure 7:
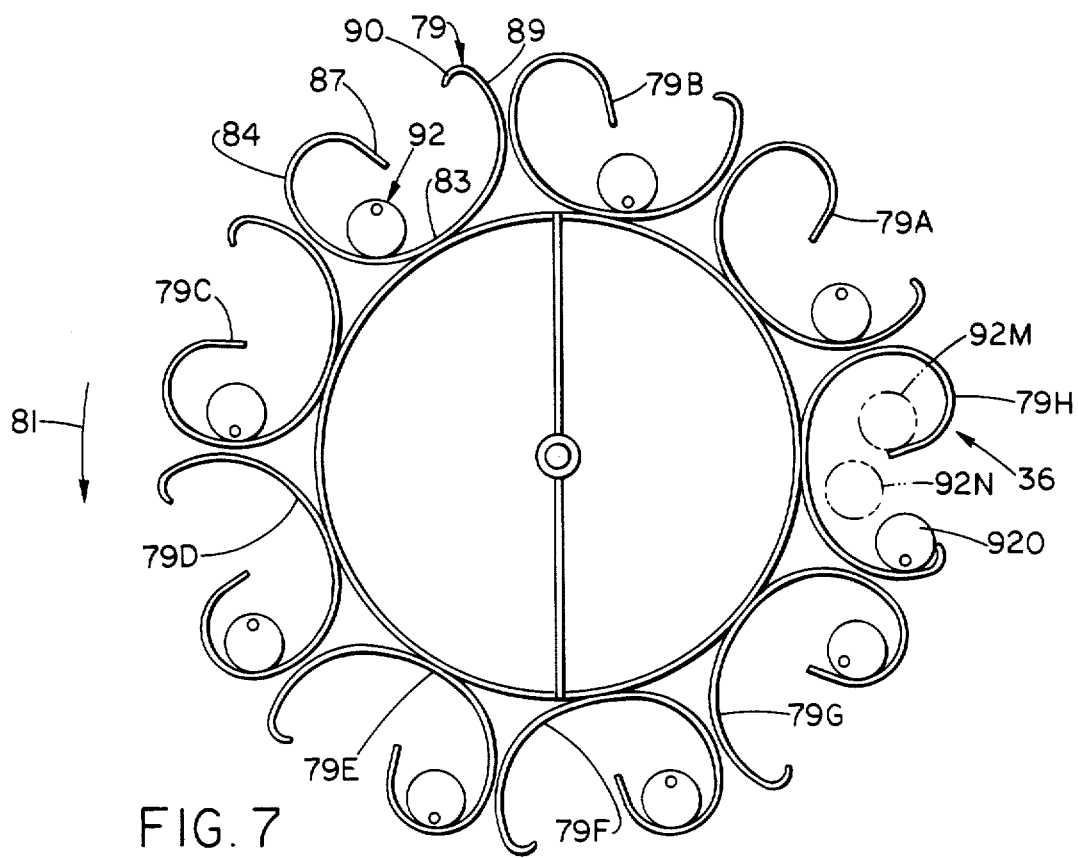
FIG. 7 is a schematic view in end elevation of the sausage holding assembly with some frame portions and end holding elements removed for clarity.

A plurality of sausage guide members 79 are mounted on the main portion 63 and 57. The shape of the sausage guide members is shown most clearly in FIG. 7. In FIG. 7, the direction of rotation of the cage assembly 36 is indicated by an arrow 81.

The guide member 79 includes a central portion 83 which is of a curvature of a large diameter. The diameter of curvature becomes progressively lesser from the central portion toward a leading portion 84. The leading portion terminates in a flat terminal portion 87. As the guide extends from the central portion 83 toward a trailing portion 89, the diameter of curvature decreases until the guide member terminates in a terminal portion 90 of hook shape.

In FIG. 7, the progression of a sausage 92 in the machine can be seen. The sausage can be introduced into the machine when the guide members supporting the sausage are at a postion 79A. As the guide members advance through the positions 79B, 79, 79C, 79D, 79E, 79F and 79G, the sausage rolls across the guides 79 so that progressive portions of the sausage are exposed to heat from the heating elements 32. As the guide reaches the position 79H, the sausage falls through the positions 92M and 92N to the position 92O where the sausage engages the hook shaped terminal portion 90 of the guide member, and the progression starts again.

The sausage cooking device illustrated in the drawings and described above is subject to structural modification without departing from the spirit and scope of the appended claims.

Having described our invention, what we claim as new and desire to secure by Letters Patent is:

1. A sausage heating machine which comprises a horizontal shaft assembly, means for turning the shaft assembly, a framework carried by the shaft assembly to rotate therewith, a plurality of baskets mounted on the framework to turn therewith, each basket having a plurality of guide members for supporting a sausage, each guide member including a main portion on which the sausage can roll as the shaft turns, a leading end portion from which the sausage can fall crosswise of the guide members, and a hook shaped trailing edge portion which catches the sausage when the sausage has fallen, and means for projecting radiant heat crosswise of the framework to heat and cook the sausage as the framework turns.

2. A sausage heating machine as in claim 1 in which the leading end portion of each of the guide members is spaced from the hook shaped trailing edge portion thereof to permit entry of the sausage into the basket.

3. A sausage heating machine as in claim 1 in which the leading end portion and the trailing end portion of each guide member are directed inwardly thereof so that the sausage leaves the leading end portion and the trailing end portion in an inward direction as the framework turns.

* * * * *

UNITED STATES PATENT AND TRADEMARK OFFICE
CERTIFICATE OF CORRECTION

PATENT NO. : 4,723,482

DATED : February 9, 1988

INVENTOR(S) : Ronald R. Weiss and Jerry K. Phillips

It is certified that error appears in the above-identified patent and that said Letters Patent are hereby corrected as shown below:

On the title page

[73] Assignee: "Gold Metal Products Co., Cincinnati, Ohio" should be

-- Gold Medal Products Co., Cincinnati, Ohio --.

Signed and Sealed this

Twenty-first Day of June, 1988

Attest:

DONALD J. QUIGG

*Attesting Officer*

*Commissioner of Patents and Trademarks*